(12) United States Patent
Schwab et al.

(10) Patent No.: US 11,098,506 B2
(45) Date of Patent: Aug. 24, 2021

(54) ACTUATING APPARATUS

(71) Applicant: ILLINOIS TOOL WORKS INC., Glenview, IL (US)

(72) Inventors: Andreas Schwab, Holzkirchen (DE); Thomas Lechner-Watzlik, Wurzburg (DE); Julian Fischer, Kleinrinderfeld (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 549 days.

(21) Appl. No.: 16/139,269

(22) Filed: Sep. 24, 2018

(65) Prior Publication Data

US 2019/0093392 A1 Mar. 28, 2019

(30) Foreign Application Priority Data

Sep. 27, 2017 (DE) ........................ 10 2017 122 395

(51) Int. Cl.
| E05B 83/34 | (2014.01) |
| E05B 63/22 | (2006.01) |
| E05C 19/02 | (2006.01) |
| E05B 81/06 | (2014.01) |
| B60K 15/05 | (2006.01) |
| E05B 47/00 | (2006.01) |

(52) U.S. Cl.
CPC .............. *E05B 83/34* (2013.01); *B60K 15/05* (2013.01); *E05B 63/22* (2013.01); *E05B 81/06* (2013.01); *E05C 19/022* (2013.01); *B60K 2015/0538* (2013.01); *B60K 2015/0561* (2013.01); *B60K 2015/0576* (2013.01); *B60K 2015/0584* (2013.01); *E05B 47/0004* (2013.01)

(58) Field of Classification Search
CPC . E05B 83/34; E05B 63/22; B60K 2015/0561; B60K 2015/0576; B60K 2015/0584; E05C 19/02; E05C 19/022; E05C 19/028; E05C 19/063; Y10S 292/04
See application file for complete search history.

(56) References Cited

U.S. PATENT DOCUMENTS

| 9,010,836 B2* | 4/2015 | Watanabe | E05C 19/022 296/97.22 |
| 9,038,499 B2* | 5/2015 | Ishiguro | E05C 19/022 74/550 |
| 9,982,467 B2* | 5/2018 | Watanabe | E05B 83/34 |
| 10,691,160 B2* | 6/2020 | Yamamoto | E05B 81/34 |
| 10,875,401 B2* | 12/2020 | Zhao | B60K 15/05 |

FOREIGN PATENT DOCUMENTS

| DE | 102008057933 | 7/2010 | |
| DE | 102009060119 | 6/2011 | |
| DE | 102011101838 | 11/2012 | |
| DE | 102012004078 | 9/2013 | |
| FR | 3016854 A1 * | 7/2015 | ............ B60K 15/05 |

* cited by examiner

Primary Examiner — Kristina R Fulton
Assistant Examiner — Noah Horowitz
(74) Attorney, Agent, or Firm — Thompson Hine LLP

(57) ABSTRACT

An actuating apparatus for opening and closing a cover in or on a vehicle, having push-push kinematics which interact with the cover.

20 Claims, 8 Drawing Sheets

ACTUATING APPARATUS

TECHNICAL FIELD

The invention relates to an actuating apparatus for opening and closing a cover in or on a vehicle, having push-push kinematics which interact with the cover.

BACKGROUND

Actuating apparatus of the type mentioned above is known for example from DE 10 2008 057 933 B4, DE 10 2009 060 119 A1, DE 10 2011 101 838 A1 or DE 10 2012 004 078 A1. In the actuating apparatus known from DE 10 2009 060 119 A1, the push-push kinematics are combined with a simultaneous rotary movement of the pusher. This is accomplished by at least one helical groove of the pusher and the engaging of at least one protrusion on the inner circumference of a housing of the actuating apparatus in the groove. The known actuating apparatus is characterized by a small number of component parts and thus a robust and economical construction. At the same time, it reliably assures the required locking and unlocking for example of a fuel tank or charger door at all times. Moreover, it can be combined with a central locking system function.

However, the known actuating apparatus sometimes has a relatively large space requirement. In certain applications, a particularly small space requirement is desired. Furthermore, there is a need to prevent in an even more secure manner the intrusion of water or dust, which may lead to problems in the operation of the actuating apparatus.

SUMMARY

Starting from the explained prior art, the problem which the invention proposes to solve is to provide an actuating apparatus of the kind mentioned above, which makes possible a reliable operation of the actuating apparatus at all times in a simple manner, while having a compact design.

The invention solves the problem by the subject matter of claim 1. Advantageous embodiments are found in the dependent claims, the description, and the figures.

The invention solves the problem by an actuating apparatus for opening and closing a cover in or on a vehicle, having push-push kinematics which interact with the cover, comprising:

a housing which is suitable for being installed in a vehicle, a pusher which is mounted in the housing so as to be rotatable about its longitudinal axis and axially movable and which has an outer actuating end that projects out of the housing via a housing opening in every axial position and an inner actuating end that is located opposite the outer actuating end and is located within the housing in every axial position, a spring in the housing, said spring preloading the pusher into a position extended furthest out of the housing, an actuating sleeve which is connected or connectable to the cover or a part carrying the cover and into which the pusher is introducible with its outer actuating end, and on the inner side of which at least one actuating groove that extends at least partially in a helical manner about the longitudinal axis of the actuating sleeve is formed, at least one actuating protrusion of the pusher engaging in said actuating groove with the pusher introduced into the actuating sleeve, such that, during an axial relative movement between the actuating sleeve and pusher, the pusher is also rotated about its longitudinal axis, wherein the spring is twisted counter to its preload during a rotation of the pusher while the pusher is being introduced into the actuating sleeve, a control sleeve which is arranged in the housing in a rotationally fixed and axially displaceable manner and with which the inner actuating end of the pusher cooperates such that, during an axial movement of the pusher in the housing, the control sleeve is moved axially along therewith, wherein the pusher is rotatable relative to the control sleeve, and a control ring which surrounds the control sleeve at least over a part of the axial adjustment region of the pusher and which is mounted in an axially fixed and rotatable manner in the housing, and which has at least one control protrusion on its inner circumference, said control protrusion engaging in a push-push control curve formed on the outer side of the control sleeve.

The actuating apparatus according to the invention serves for opening and closing a cover which is mounted in or on a vehicle, such as a passenger car or a lorry. The cover is movably mounted on the vehicle, for example swivel mounted, for example on the outside of the vehicle. The cover may be a door, for example a fuel tank and/or charger door. The housing of the actuating apparatus according to the invention is fastened for example to the bodywork of the vehicle. It may be arranged for example in a fuel tank and/or charger recess of the vehicle.

The actuating apparatus comprises a pusher, which may have for example a circular cylindrical base shape. The pusher is mounted in the housing rotatably and axially movable between two end positions. On the cover door there is arranged an actuating sleeve, in which the pusher is inserted upon closing the cover. When the door is opened, on the other hand, the actuating sleeve is released from the pusher. On its inside, the pot-shaped (for example) actuating sleeve has at least one helical actuating groove. At least one actuating protrusion of the pusher is guided in this groove when the pusher is inserted into the actuating sleeve and is moved axially in the actuating sleeve relative to it. The helical shape means that the pusher, during such an axial relative movement, is also forced to perform a rotary movement. For example, it may be provided that the pusher is rotated by 90° along the maximum axial travel path in the actuating sleeve. The at least one actuating protrusion engaging in the at least one actuating groove of the actuating sleeve is arranged in particular in the area of the outer actuating end of the pusher. The actuating sleeve may be secured to the cover or a part carrying the cover or it may be connected to the latter as a single piece. The part carrying the cover may be, for example, a hinge arm carrying the cover or an adapter plate carrying the cover and connected to a hinge arm. The hinge arm is mounted in familiar manner, such as swivel mounted, on the housing, for example on a fuel tank recess and/or charger recess. By this swivel mounting, the cover can be swivelled accordingly between an opened and a closed position.

Furthermore, a spring is arranged in the housing, which preloads the pusher in its position furthest extended out from the housing. A rotating of the pusher in the actuating sleeve during the inserting of the pusher into the actuating sleeve occurs with a twisting of the spring against the preloading of the spring. The spring then thus tries to turn the pusher back to the initial position. Furthermore, the pressing of the pusher into the housing occurs with a compressing of the spring and thus likewise against the preloading of the spring. The spring therefore tries to push the pusher, having been shoved into the housing, back out from the housing into the furthest extended position. The spring is thus in particular a combined compression and torsion spring. For example, the spring may be a helical spring, such as a metal helical spring. The spring may be attached by its first end to the pusher and by its second end to the housing. It may be braced by one end against the pusher and by its other end against the housing. For example, the pusher may have a hollow cylindrical shape, with a central journal, surrounded by the helical spring.

Furthermore, a control sleeve is arranged in the housing, with which the inner actuating end of the pusher cooperates, for example, it is connected to it. The control sleeve may have a hollow circular cylinder basic shape. The control sleeve upon axial movement of the pusher in the housing is carried along axially, and vice versa. The axial relative position between the pusher and the control sleeve thus remains the same. Furthermore, the control sleeve is arranged rotationally firmly in the housing and the pusher is rotatable relative to the control sleeve. For the rotationally firm arrangement in the housing, the control sleeve may have a bearing protrusion or a bearing receptacle, for example, which engages with form fit in a corresponding bearing receptacle or with a corresponding bearing protrusion of the housing, so that a rotary movement of the control sleeve is prevented.

The control sleeve is furthermore surrounded at least for a portion of the axial adjustment region of the pusher and thus of the control sleeve by a control ring likewise arranged in the housing. The control ring is mounted axially firmly and rotatably in the housing. Preferably, the control ring surrounds the control sleeve in every axial position of control sleeve and pusher. For example, the control ring may be secured in the axial direction between two bearing protrusions of the housing. The control ring has, on its inner circumference, at least one control protrusion, which engages with a push-push control curve formed on the outside of the control sleeve. In this way, the control sleeve and, with it, the pusher may, in accordance with the push-push kinematics dictated by the push-push control curve in concert with the at least one control protrusion of the control ring, be locked at first in familiar manner in the housing from the position furthest extended from the housing by a pressing into the housing and a short return stroke and then unlocked in likewise familiar manner by a further pressing into the housing and be brought into the position furthest extended from the housing.

In the actuating apparatus according to the invention, only the pusher in particular protrudes by its outer actuating end from the housing, but for its entire axial travel path. The other components of the pusher, in particular its inner actuating end, as well as the other components of the actuating apparatus, in particular the control sleeve and control ring, are at all times situated inside the housing. Hence, all functionally critical interfaces are accommodated inside a compact housing and protected against negative environmental factors, especially the intrusion of dirt or moisture. At the same time, a simple and reliable locking and unlocking of the cover is realized at all times. Furthermore, the actuating apparatus according to the invention enables the locking and unlocking with a slight movement of the pusher. This, in turn, means only a slight vacuum when removing the pusher from the housing and thus less suctioning of dirt or moisture.

Besides the compact and space-saving size, a modular design of the actuating apparatus makes possible a flexible functional design. A simple mounting of the housing is possible, for example on a fuel tank door and/or charger door module, for example by latching or screw fasteners. At the same time, there is easy adjustability, for example, when matching up with joints. Small tolerances can be achieved in regard to the positioning, for example, in a fuel tank door and/or charger door module. At the same time, a simple tool-based production is possible, since the components of the actuating apparatus can be made primarily of plastic in an injection moulding process.

According to one configuration it may be provided that:

the push-push control curve comprises at least one first deflection surface which extends obliquely with respect to the axis of the control sleeve and which cooperates with the at least one control protrusion of the control ring and rotates the control ring through a predetermined angle in a direction of rotation when the control sleeve is moved into the housing with the pusher with a predetermined first stroke, the push-push control curve also comprises at least one locking recess, open towards the outer actuating end of the pusher, at a circumferential distance from the at least one first deflection surface, said locking recess receiving the at least one control protrusion of the control ring when the pusher is released after the first stroke, with the result that the pusher is locked in a locking position in the housing with the control sleeve after a return stroke brought about by the preload of the spring, and the push-push control curve also comprises at least one second deflection surface that extends obliquely with respect to the axis of the control sleeve at the circumferential distance from the at least one locking recess, said second deflection surface cooperating with the at least one control protrusion of the control ring when the control sleeve is moved further into the housing with the pusher from the locking position with a second stroke, with the result that the control ring is rotated through a predetermined second angle in the direction of rotation into a rotational position in which the control sleeve is movable into the position extended furthest out of the housing with the pusher by the preload of the spring.

The push-push control curve may be configured as is basically familiar from DE 10 2009 060 119 A1. When there are several control protrusions of the control ring, the control curve configuration may repeat regularly in accordance with the number of control protrusions. The at least one control protrusion of the control ring, after the deflection by the second deflection surface, may exit from the push-push control curve through an exit opening of the push-push control curve. This configuration of the push-push control curve has proven to be particularly robust and reliable in practice.

For further protection against intrusion of dirt or moisture, a seal may be provided between the housing opening and the pusher, preferably a sealing ring surrounding the housing opening. The portion of the pusher sliding along the housing opening or the seal may have a circular cylinder shape with a smooth outer surface. In this way, impairment of the sealing effect during the axial movement of the pusher is securely prevented.

The at least one actuating groove in the actuating sleeve may form at least one end receptacle at the inner end thereof, the at least one actuating protrusion of the pusher being received in said end receptacle, in the state introduced fully into the actuating sleeve, such that the pusher cannot be released therefrom without being rotated in the actuating sleeve again. The inner end is the end of the actuating groove or actuating sleeve facing away from the pusher. This configuration ensures that the actuating sleeve and hence the cover cannot be loosened from the pusher in the state of the control sleeve and pusher locked in the housing. An unwanted opening of the cover is securely prevented. The control sleeve and the pusher are mounted almost free of play when the door is closed. The twisting of the spring when the pusher is inserted into the actuating sleeve ensures that the pusher in the state unlocked from the push-push control curve is again unscrewed from the end receptacle and thus from the actuating sleeve, so that the actuating sleeve together with the cover can be loosened from the pusher. In the state locked in the housing by the push-push kinematics, the pusher is secured against rotation in suitable manner, so that the spring cannot unscrew the pusher from the end receptacle of the actuating groove. For example, this can be ensured by a suitable end stop on the housing.

According to an especially practical oriented configuration, the control sleeve may be held in a latched manner on the inner actuating end of the pusher. For example, the control sleeve may be latched onto the inner actuating end of the pusher and thus form at least part of the outer surface of the inner actuating end of the pusher. The control sleeve in this case can rotate on the pusher.

According to another configuration, at least one first stop portion may be provided on the housing, and at least one second stop portion may be provided on the inner actuating end of the pusher, wherein the stop portions cooperate such that an axial movement of the pusher into the housing is allowed only after it has entered the actuating sleeve and passed through the actuating groove. The inserting of the pusher into the housing is thus only possible after the rotating of the pusher brought about by the at least one helical actuating groove, i.e., in particular, only upon reaching the at least one end receptacle of the at least one actuating groove. Thus, at first the actuating sleeve with the cover is pressed onto the pusher, while the at least one actuating protrusion of the pusher runs along the at least one actuating groove and in this process the pusher is rotated, without any axial movement of the pusher occurring. Thus, the axial relative movement between pusher and actuating sleeve is at first generated solely by the axial movement of the actuating sleeve. Only after this rotation, which may amount to 90° for example, can the pusher be pressed into the housing. Hence, the overall axial travel required for the pusher is decreased in that a considerable portion of the control process involves an exclusive rotary movement between pusher and actuating sleeve, and thus an axial movement of the actuating sleeve with no axial movement of the pusher. Among other things, this means less formation of a partial vacuum in the housing and hence less suctioning of dirt or moisture. The maximum axial travel of the pusher can be appreciably decreased as compared to known actuating apparatus, for example, to a linear stroke of no more than 5 mm, preferably no more than 3 mm. At the same time, during the rotating of the pusher in the actuating sleeve a further opening movement is realized for the actuating sleeve and with it the cover, without the pusher likewise having to move axially. By contrast with known actuating apparatus, only a small portion of the opening movement of the cover is realized by an axial travel of the pusher. The greater portion of the opening movement may occur during an exclusive rotation movement of the pusher. For example, the opening movement of the actuating sleeve and thus the cover during the exclusive rotary movement of the pusher may be more than three times greater than the opening movement brought about during the axial movement of the pusher. Merely as an example, the opening movement of actuating sleeve and door brought about by an axial travel of the pusher may amount to 3 mm, while the opening movement brought about during the exclusive rotation of the pusher amounts to 11 mm. Thus, on the whole, an opening movement (and of course a corresponding closing movement) of the cover of 14 mm is achieved. This opening movement is enough to then reach around the back of the cover, by hand for example, for its complete opening. An automatic complete opening would also be possible, of course.

According to another configuration, the at least one first stop portion may comprise at least one stop surface in the form of an annular sector, and the at least one second stop portion may comprise at least one stop protrusion that bears against the stop surface in the form of an annular sector until the axial movement of the pusher into the housing is allowed. The at least one stop protrusion may be arranged in particular at the inner actuating end of the pusher. The at least one stop surface forms a portion or a segment of a circular ring. The stop surface in the form of an annular sector has a top side lying in a plane situated perpendicular to the pusher longitudinal axis. The stop protrusion lies against this stop surface in the form of an annular sector during the movement along the actuating groove. Accordingly, no axial movement of the pusher into the housing is possible. Only after travelling completely along the stop surface in the form of an annular sector can the stop protrusion and hence the pusher enter into the housing.

At least one ramp may adjoin the at least one stop surface in the form of an annular sector, the at least one stop protrusion bearing against said ramp at least temporarily during the axial movement of the pusher. The ramp ensures a defined guidance of the pusher via its stop protrusion after travelling along the stop surface in the form of an annular sector and after the entry of the pusher into the housing.

Furthermore, at least one annular groove may adjoin the at least one ramp. If the pusher has two stop protrusions, one of the stop protrusions may be guided in the annular groove, while the other stop protrusion is guided on the stop surface in the form of an annular sector. In this way, a further guiding of the pusher is achieved. At the end of the annular groove there may be provided an end stop, which prevents a rotating of the pusher in the state locked by the push-push kinematics, so that the twisted spring cannot unscrew the pusher out from the actuating sleeve.

The at least one stop surface in the form of an annular sector and/or the at least one ramp and/or the at least one annular groove may be formed on an intermediate plate of the housing. The intermediate plate may be arranged between a bottom portion and a cover of the housing.

According to another configuration, a position sensor may be provided which indicates an open and/or closed position of the cover. The position sensor may comprise a position switch which is actuated by a position protrusion, formed on the pusher or the control sleeve, when the cover is located in the open and/or closed position. In particular, a mechanical switching of the position switch occurs. The position switch may be a micro switch, for example.

The actuating apparatus may furthermore comprise a blocking device with which the pusher is able to be prevented from extending out of the housing in a locking position retracted into the housing. The blocking device may be part of a central locking system of the vehicle. The locking position is in particular the locking position in the push-push control curve.

According to an especially practical oriented configuration, the blocking device may comprise a blocking bolt, and the pusher comprises a blocking recess on its outer side, wherein the blocking bolt is adjustable by means of a drive device, preferably an electric motor, between a blocking position engaging in the blocking recess and a release position withdrawn from the blocking recess. The blocking bolt in particular will travel perpendicular to the longitudinal axis of the pusher.

The drive device, such as an electric motor, may drive the blocking bolt via a gear wheel that is able to be driven in rotation, wherein a rack that is manually actuable is engaged with the gear wheel. Movement of the rack may be transformed into movement of the gear wheel engaged with the rack, which in turn may drive the blocking bolt. The rack may be manually actuable in order to manually move the blocking bolt into the release position. The rack is part of an emergency unlocking system, with which the blocking of the pusher can be cancelled upon failure of the drive device during an accident. For this, the rack can be operated manually, for example may be pulled via a pulling device, such as a Bowden cable, by which the gear wheel for moving, for example pulling, of the blocking bolt into the release position is moved, for example pulled. Accordingly, a pulling device may be provided wherein the rack may be actuable through manually pulling the pulling device.

According to a further embodiment the pulling device may be elastic and may be (elastically) deformed upon manual pulling whereby the rack is actuated. For example the pulling device may be a pulling strap comprising a manually engagable engagement end wherein the opposite end of the pulling strap is positionally fixed. In this manner, manually pulling the engagement end of the pulling strap leads to deformation of the pulling strap. The pulling device may further comprise an actuating section which upon manual pulling exerts a pushing force onto the rack. The rack is thus pushed by the actuating section of the pulling device for example when the pulling device is deformed manually. The manually exerted pulling force is thus transformed into a pushing force onto the rack. The rack may be moved in particular in its longitudinal direction. Through engagement with the gear wheel movement of the rack results in a rotating movement of the gear wheel which in turn moves the blocking bolt into the release position.

The invention also relates to a cover of a vehicle, comprising an actuating apparatus according to the invention. As already mentioned, the cover may be a fuel tank and/or charger door. Accordingly, the invention also relates to a fuel tank and/or charger door arrangement with an actuating apparatus according to the invention.

BRIEF DESCRIPTION OF THE DRAWINGS

Exemplary embodiments of the invention shall be explained more closely below with the aid of figures. There are shown, schematically.

DETAILED DESCRIPTION

Unless otherwise indicated, the same reference numbers in the figures denote the same objects.

Figure 1:
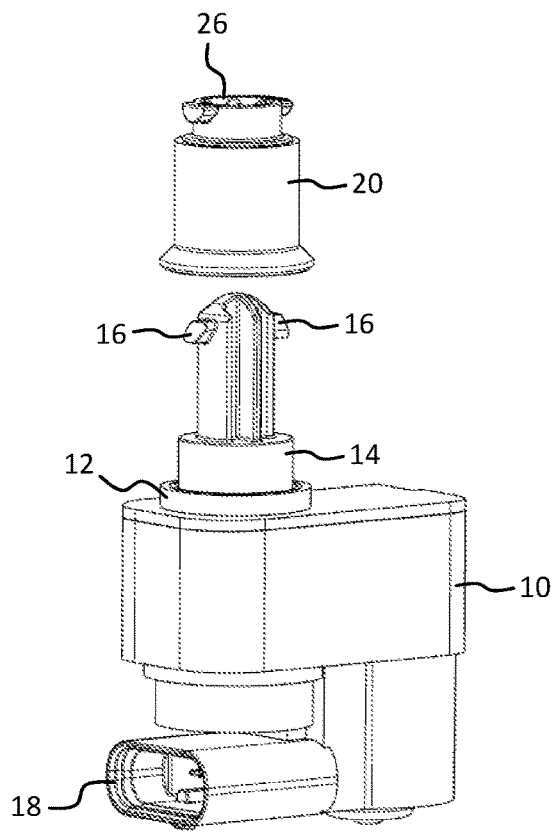
FIG. 1 an actuating apparatus according to a first embodiment of the invention in a perspective view in a first operating state, FIG. 2 the actuating apparatus of FIG. 1 in a partly sectioned perspective view, FIG. 3 the representation of FIG. 2 in a second operating state, FIG. 4 the representation of FIG. 2 in a third operating state, FIG. 5 the actuating apparatus shown in FIG. 1 in a perspective exploded drawing, FIG. 6 the actuating apparatus of FIG. 1 in a side view, FIG. 7 a sectional representation along line A-A in FIG. 6, FIG. 8 part of the actuating apparatus shown in FIGS. 1 to 7 in a perspective view in a first operating state, FIG. 9 the representation of FIG. 8 in a further operating state, FIG. 10 the representation of FIG. 8 in a further operating state, FIG. 11 the representation of FIG. 8 in a further operating state, FIG. 12 another perspective partial representation of the actuating apparatus shown in FIGS. 1 to 11 in a first operating state, FIG. 13 the representation of FIG. 12 in a further operating state, FIG. 14 the representation of FIG. 12 in a further operating state, FIG. 15 the representation of FIG. 12 in a further operating state, FIG. 16 another partial representation of the actuating apparatus shown in FIGS. 1 to 15 in a first operating state, FIG. 17 the representation of FIG. 16 in a further operating state, FIG. 18 the representation of FIG. 16 in a further operating state, FIG. 19 a partial view of an actuating apparatus according to a second embodiment of the invention in a perspective view in a first operating state, FIG. 20 a further perspective view of the view of FIG. 19, and FIG. 21 a partial view of the actuating apparatus shown in FIG. 19 in a second operating state.
Figure 2:
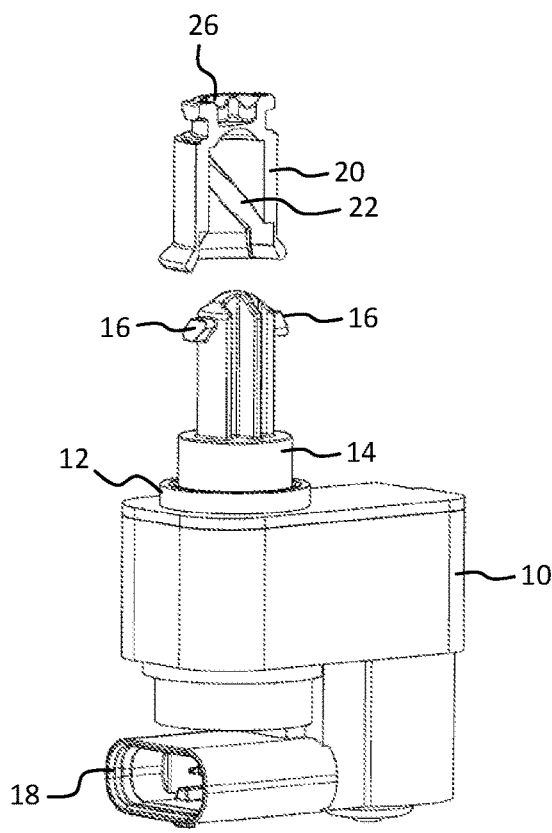
Figure 3:
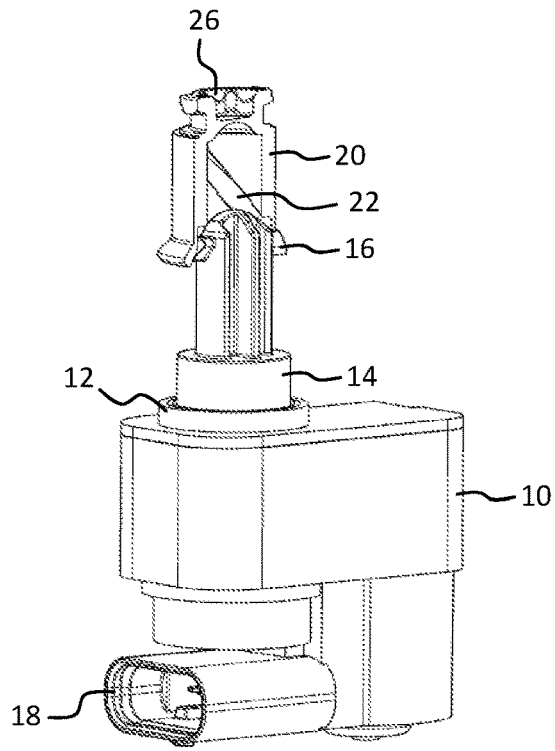
Figure 4:
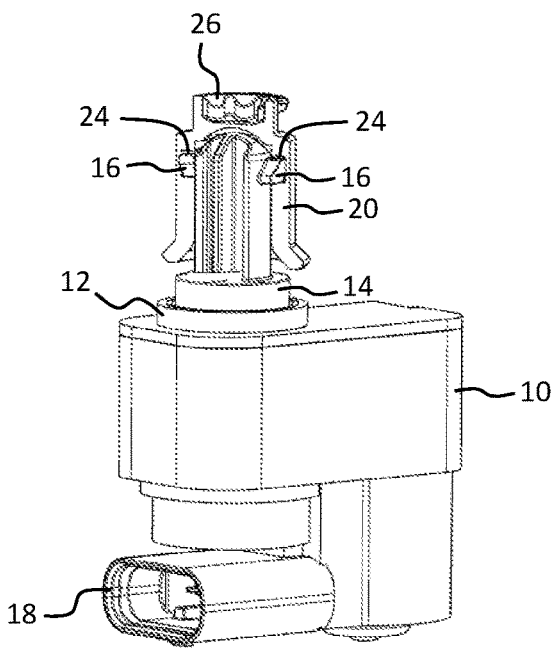

In FIGS. 1 to 4 an actuating apparatus according to a first embodiment of the invention can be seen, having a housing 10 with a housing opening 12, from which a cylindrical pusher 14 is protruding. The pusher 14 has an outer actuating end which can be recognized in FIGS. 1 to 4, on which two oppositely situated actuating protrusions 16 are formed in the example shown. An inner actuating end situated opposite the outer actuating end is located at all times inside the housing 10 and cannot be seen in FIGS. 1 to 4. Furthermore, reference number 18 denotes an electrical terminal of the housing. There can also be seen in FIGS. 1 to 4 a pot-shaped actuating sleeve 20. In FIGS. 2 to 4, the actuating sleeve 20 is shown sliced open, for illustrative purposes. It can be seen that the actuating sleeve 20 has two actuating grooves 22 on its inside, in each of which one of the actuating protrusions 16 engages when the pusher 14 is inserted into the actuating sleeve 20. The actuating grooves 22 run for a portion in a helical manner about the longitudinal axis of the actuating sleeve 20. In this way, the pusher 14 which is rotatably mounted in the housing 10 is rotated when being inserted into the actuating sleeve 20, in the example shown, by 90° for a complete insertion into the actuating sleeve 10. The state fully inserted into the actuating sleeve 20 can be seen in FIG. 4. The actuating protrusions 16 are received respectively in end receptacles 24 of the actuating grooves 22, so that the actuating sleeve 20 in the state shown in FIG. 4 cannot be loosened from the pusher 14 by an upward axial movement. For this, instead, the pusher 14 must first be unscrewed along the actuating grooves 22 from the actuating sleeve 20. The actuating sleeve 20 is secured by a fastening portion 26 on a cover, not shown more closely in the figures, such as a fuel tank and/or charger door, swivel mounted on a vehicle, such as a passenger car or a lorry. FIGS. 1 and 2 show the opened state of the cover, in which the actuating sleeve 20 is loosened from the pusher 14. FIG. 3 shows the state in which the pusher 14 is just entering into the actuating sleeve 20. FIG. 4 shows the state of the pusher 14 having fully entered into the actuating sleeve 20 and being locked in the housing 10. The pusher 14 here has moved axially into the housing 10 and the cover is closed and locked.

Figure 5:
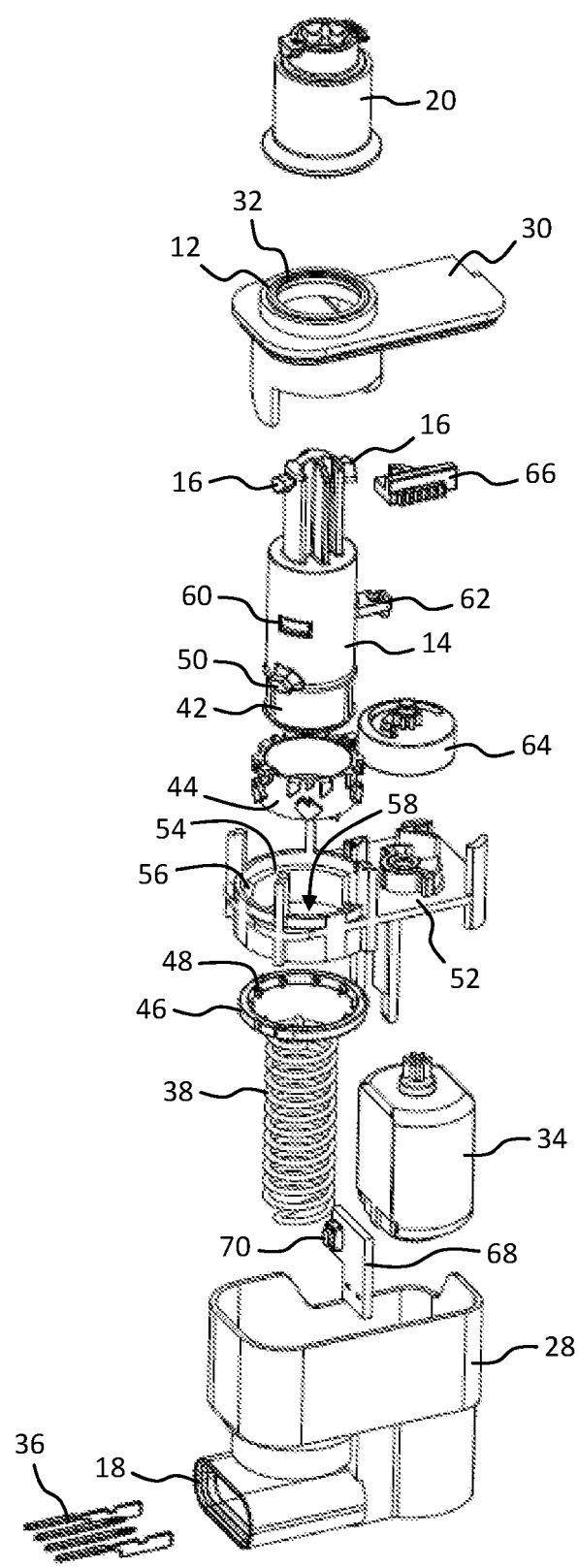
Figure 6:
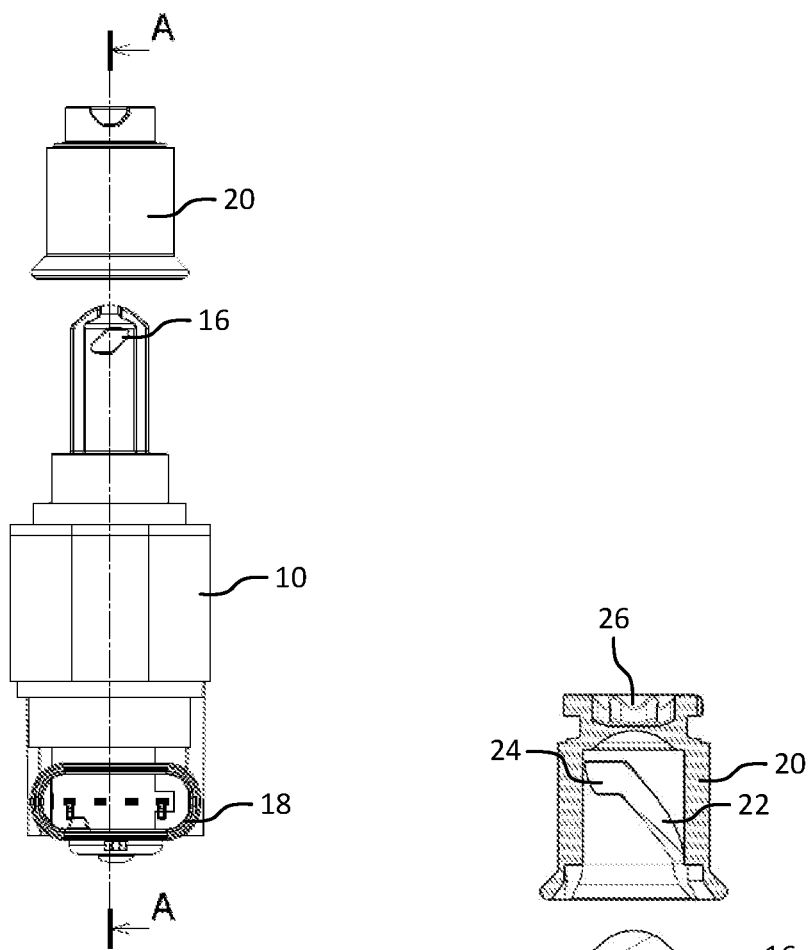
Figure 7:
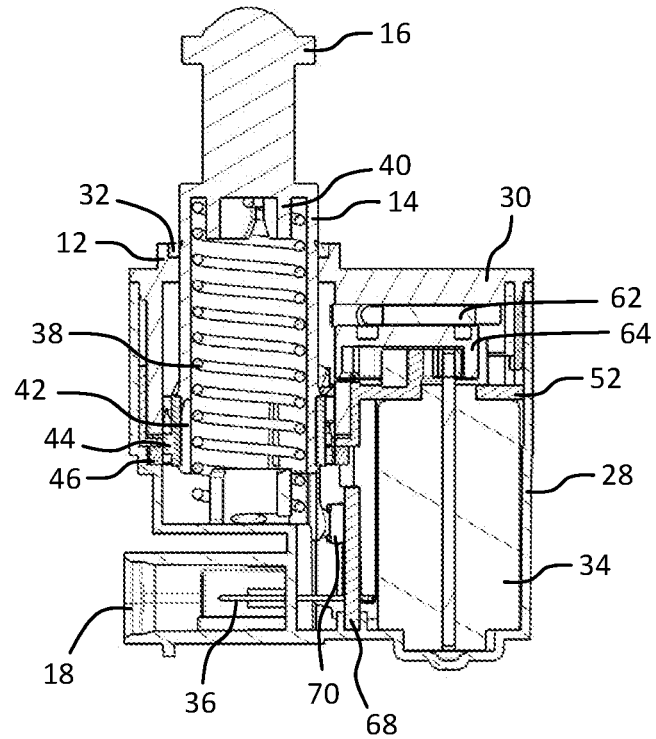

The design of the actuating apparatus according to the invention shall be explained more closely with the representation in FIG. 5. As can be seen here, the housing 10 possesses a base body 28 and a cover 30, which forms the housing opening 12. On the inner surface of the housing opening 12 there is arranged an encircling sealing ring 32, which lies against the outside of the pusher 14. Moreover, in the base body 28 of the housing 10 is arranged an electric motor 34, which is electrically powered by electrical contacts 36. Furthermore, in the base body 28 of the housing 10 there is arranged a helical spring 38. As can be seen for example in the cross sectional representation of FIG. 7, the helical spring 38 is braced by its lower end, in FIG. 7, against a bottom surface of the base body 28. Furthermore, the helical spring 38 is firmly attached by this end to the bottom surface. It extends moreover into the pusher 14, configured for a portion as a hollow cylinder, embraces a central journal 40 of the pusher 14, and is braced against an inner surface of the pusher 14, situated opposite the bottom surface of the base body 28. Moreover, it is firmly attached by its upper end, in FIG. 7, to the inner surface of the pusher 14. In this way, the spring 38 is compressed against its preloading upon axial movement of the pusher 14 into the housing 10. Moreover, a twisting of the spring 38 against its preloading occurs upon rotation of the pusher 14 in the course of being inserted into the actuating sleeve 20.

FIG. 5 shows furthermore the inner actuating end 42 of the pusher 14 situated opposite the outer actuating end. At its inner actuating end 42, in the example shown, a control sleeve 44 is arranged in latching and rotatable manner, so that the control sleeve 44 which can rotate relative to the pusher 14 is carried along by an axial movement of the pusher 14, and vice versa. On the outer surface of the control sleeve 44 is formed a push-push control curve, whose function shall be explained more closely below. In the mounted state, the control sleeve 44 is surrounded by a control ring 46 in every axial position of the pusher 14 and thus of the control sleeve 44, on whose inside a plurality of control protrusions 48 are formed. Near its inner actuating end 42, the pusher 14 furthermore has two oppositely situated stop protrusions 50 on its outer surface. Furthermore, an intermediate plate 52 is provided between the base body 28 and the cover 30 of the housing 10, forming a stop surface 54 in the form of an annular sector, adjoined by a ramp 56 and an annular groove 58, hidden in FIG. 5, which shall be explained more closely below, along with the ramp 56 and the stop surface 54 in the form of an annular sector, with the aid of FIGS. 12 to 15. In operation, the stop protrusions 50 are guided by the stop surface 54, the ramp 56 and the annular groove 58, as shall also be explained more closely below.

In FIG. 5, one can furthermore recognize a blocking recess 60 above the stop protrusions 50 on the outside of the pusher 14. This blocking recess 60 can engage with a blocking bolt 62 for the blocking of the pusher 14 and thus the cover in a position of the pusher 14 locked in the housing. The electric motor 34 is used for this, interacting by a gear wheel 64 with the blocking bolt 62 and able to move it in a direction running perpendicular to the longitudinal axis of the pusher 14 between a blocking position engaging in the blocking recess 60 and a release position retracted from the blocking recess 60. A rack 66 is also provided for manual unlocking. For example, by a Bowden cable not otherwise represented in the figures a tension can be exerted on the rack 66 so that the blocking bolt 62 can be pulled out from the blocking recess 60, for example upon failure of the electric motor 34 or failure of the electrical power supply. Reference number 68 further denotes a switch plate, which carries a micro switch 70. As will be explained more closely below with the aid of FIGS. 16 to 18, the control sleeve 44 comprises a position protrusion 72, not noticeable in FIG. 5, which activates the micro switch 70 as a position switch when the cover is opened, in the example shown, and thus indicates the opened position of the cover.

With the aid of FIGS. 8 to 15 the locking and unlocking function of the actuating apparatus according to the invention shall be explained. The operating state shown in FIG. 8 corresponds to the operating state shown in FIG. 12. The operating state shown in FIG. 9 corresponds to the operating state shown in FIG. 13. The operating state shown in FIG. 10 corresponds to the operating state shown in FIG. 14 and the operating state shown in FIG. 11 corresponds to the operating state shown in FIG. 15. In FIGS. 12 to 15, just as in FIGS. 8 to 11, various components of the actuating apparatus according to the invention are not shown, for reasons of clarity. Furthermore, only a portion of the intermediate plate 52 is represented in FIGS. 12 to 15, namely, the stop surface 54 in the form of an annular sector, the ramp 56 and the annular groove 58. Of course, these form a single piece of the intermediate plate 52 and are represented by themselves in FIGS. 12 to 15 solely for reasons of clarity.

Figure 8:
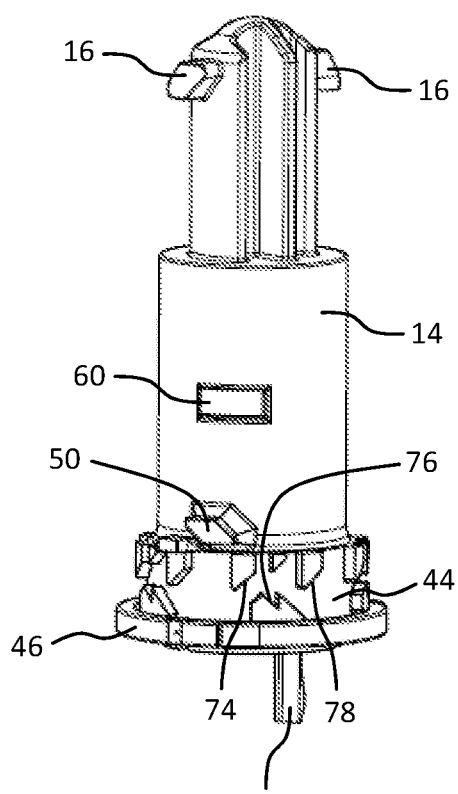
Figure 12:
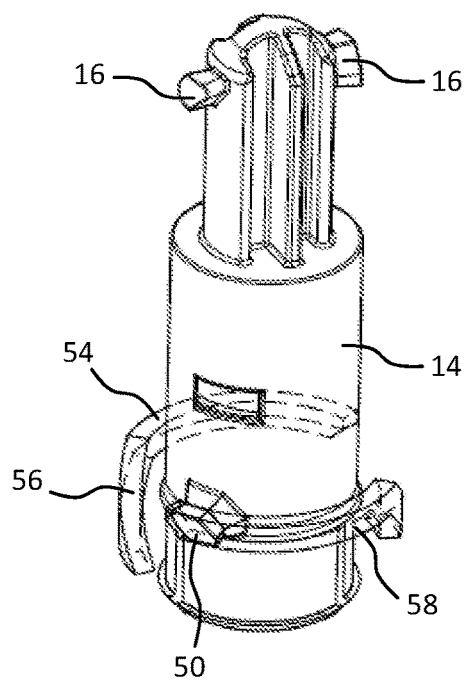
Figure 13:
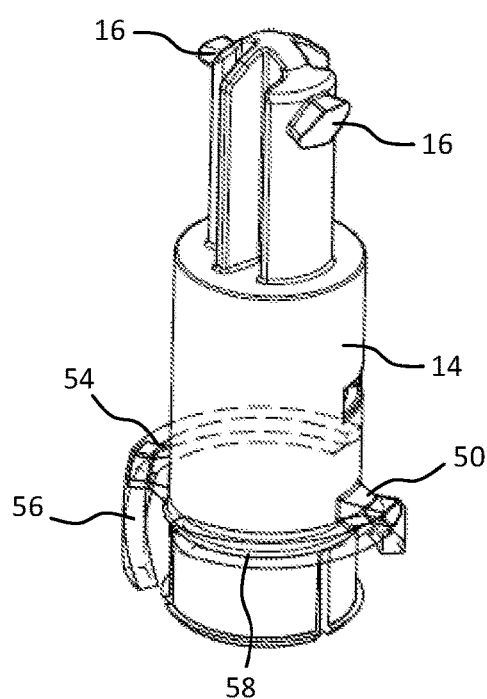

In FIGS. 8 and 12, the cover with the actuating sleeve 20 is in the open position. The pusher 14 is in its position furthest extended from the housing 10. The control ring 46 is located accordingly at the lower end of the control sleeve 44 in FIG. 8. Now, if the actuating sleeve 20 is shoved together with the cover onto the outer actuating end of the pusher 14, the actuating protrusions 16 will fit into the actuating grooves 22 and upon subsequent further pressing of the actuating sleeve 20 onto the outer actuating end of the pusher 14 there will occur a rotation of the pusher by around 90° on account of the helical trend of the actuating grooves 22. During this rotary movement, the stop protrusions 50 of the pusher 14 are guided by the stop surface 54 in the form of an annular sector and the annular groove 58. Thus, one of the stop protrusions 50 rests against the stop surface 54, while the other stop protrusion 50 is guided in the annular groove 58. In this way, an axial movement of the pusher 14 in the housing 10 is prevented during the rotating of the pusher 14 occasioned by the actuating grooves 22. Only after the pusher 14 has been fully inserted into the actuating sleeve 20 and the actuating protrusions 16 have been received in the end receptacles 24 of the actuating grooves 22 can the pusher 14 be moved axially into the housing 10 by further pressing in of the cover. In this process, the stop protrusion 50 previously resting against the stop surface 54 is guided along the ramp 56, while the oppositely situated stop protrusion 50 is free. The state just prior to the axial shoving in of the pusher 14 and after complete travel through the actuating grooves 22 is shown in FIGS. 9 and 13.

Figure 9:
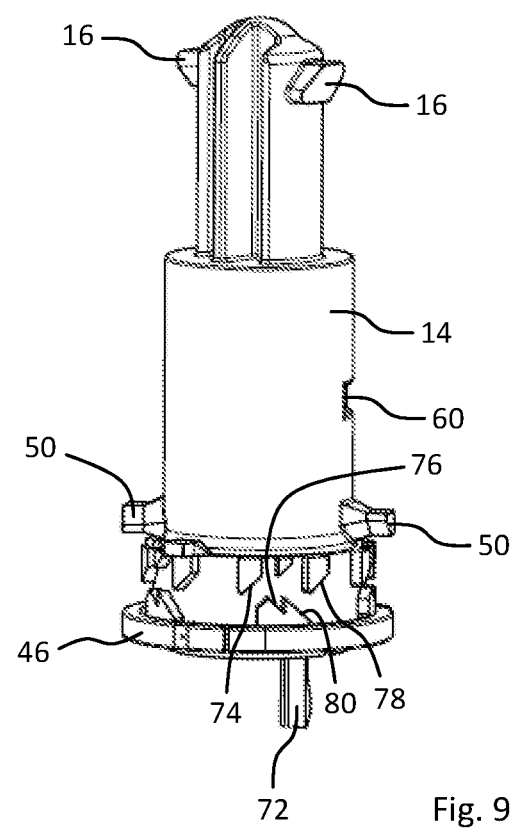
Figure 10:
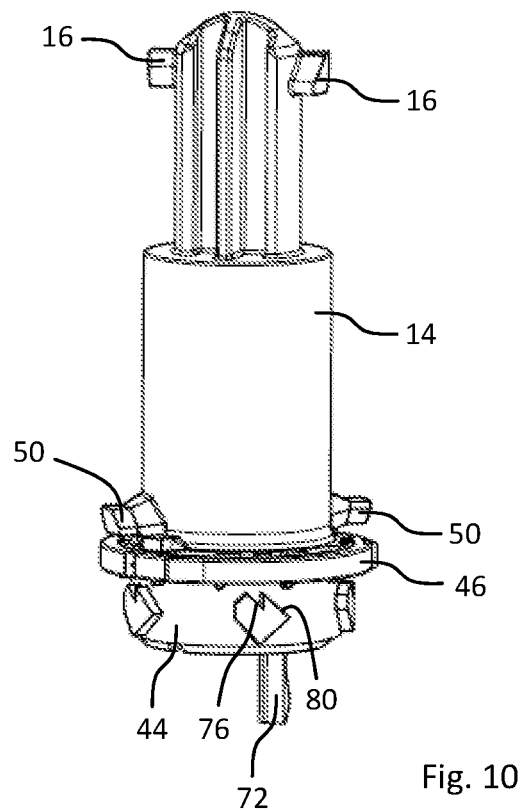
Figure 14:
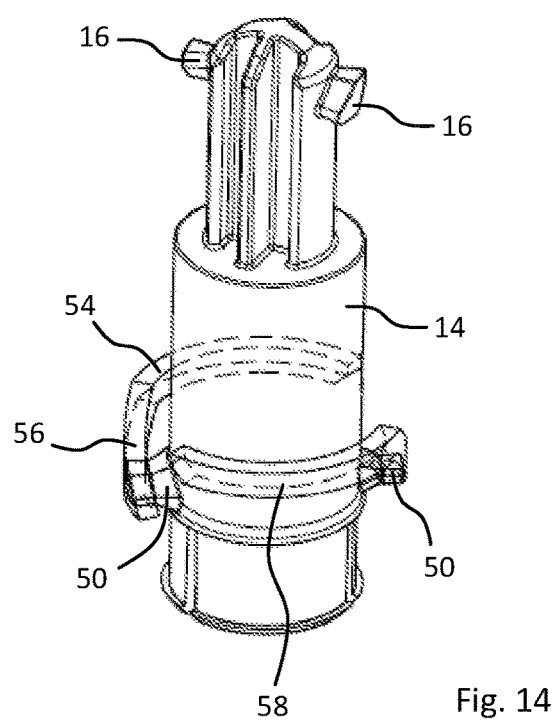

In FIGS. 10 and 14 the state of the cover pressed into the housing 10 is shown, i.e., the state of the pusher 14 shoved to the maximum into the housing 10. The control protrusions 48 on the inside of the control ring 46 cooperate with the push-push control curve on the outside of the control sleeve 44 to realize push-push kinematics. For example, it can be seen in FIGS. 8 and 9 that the push-push control curve has first deflection surfaces 74 running at a slant to the axis of the control ring or the control sleeve 44. At a circumferential distance from the first deflection surfaces 74 the push-push control curve furthermore has locking recesses 76 open toward the outer actuating end of the pusher 14, i.e., toward the top in FIGS. 8 to 11. At a further circumferential distance from the locking recesses 76, the push-push control curve has second deflection surfaces 78 running at a slant to the axis of the control sleeve 44. In the example shown, the control ring 46 has several control protrusions 48 on its inside. Accordingly, the explained control curve configuration is repeated depending on the number of control protrusions in regular fashion over the circumference of the control sleeve 44. Thus, there are as many first deflection surfaces 74, locking recesses 76 and second deflection surfaces 78 as there are control protrusions 48.

Figure 15:
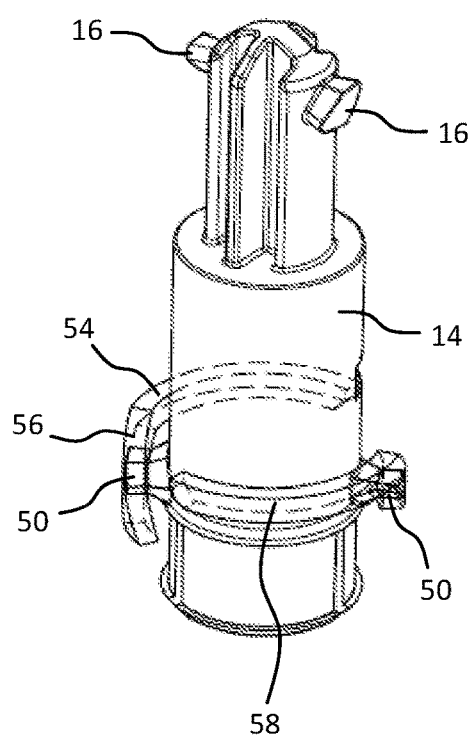

In the course of the axial movement of the pusher 14 into the housing 10, thus, downward in FIG. 9, at first the control protrusions 48 of the control ring 46 engage with the first deflection surfaces 74, by which the control ring 46 rotatably mounted in the housing is rotated relative to the control sleeve 44, mounted firmly against rotation, or to the right in FIG. 9. If the cover is released after this pressing of the pusher 14 into the housing 10, the pusher 14 will again be forced a bit out from the housing 10 on account of the preloading of the spring 38, and thus it performs a return stroke, upward in FIG. 10. The control protrusions 48 further rotated then fit into the locking recesses 76, so that the control sleeve 44 and with it the pusher 14 as well as the actuating sleeve 20 and the cover are locked in the position shown in FIG. 11. The control protrusion 50 at first guided downward along the ramp 56 is accordingly moved upward again for a bit along the ramp 56, as can be seen in FIG. 15. In order to open the cover once more from this position, the cover and with it the pusher 14 is once more pressed a bit into the housing 10, after which the control protrusions 48 of the control ring 46 come to engage with the second deflection surfaces 78, thereby further turning the ring, so that the control protrusions 48 can now be moved downward along the guide surfaces 80 of the push-push control curve in FIGS. 8 to 11, resulting in a further rotation of the control ring 46 in the turning direction. In this state, the pusher 14 can be pushed back by the helical spring 38 into its maximum extended position from the housing 10. Due to the twisting which occurred previously in the course of the rotation in the actuating sleeve 20, the spring 38 also rotates the pusher 14 back in the actuating sleeve 20 along the actuating grooves 22, so that the actuating sleeve 20 can be released from the pusher 14. In this opened position, the cover can be grasped manually, for example, in order to swing the cover entirely open, whereupon the actuating sleeve 22 is once more away from the pusher 14. Obviously, however, an automatic complete opening of the cover would also be conceivable, for which a further spring could be provided, for example.

Figure 11:
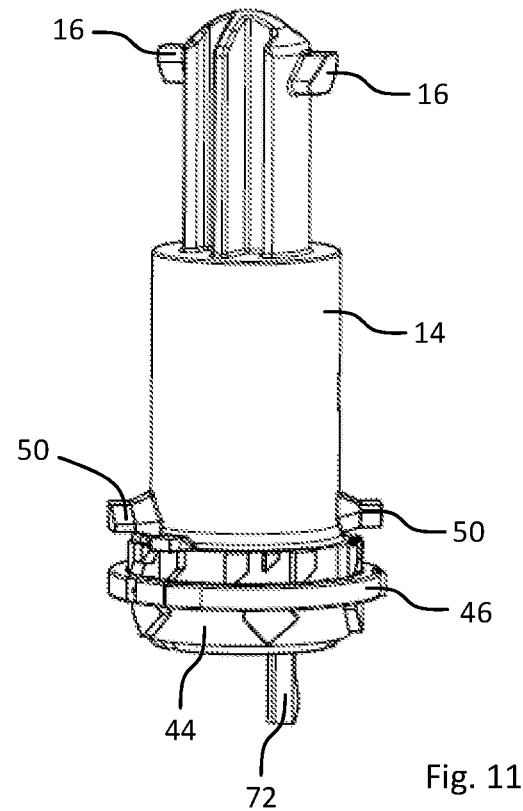

In the position shown in FIGS. 11 and 15, furthermore, the blocking bolt 62 can be retracted by the electric motor 34 into the blocking recess 60, which blocks a further opening of the cover by again pressing it into the housing 10 in the context of a central locking system of the vehicle. Only after retracting the blocking bolt 62 from the blocking recess 60 can the above explained unlocking and opening of the cover occur.

Figure 16:
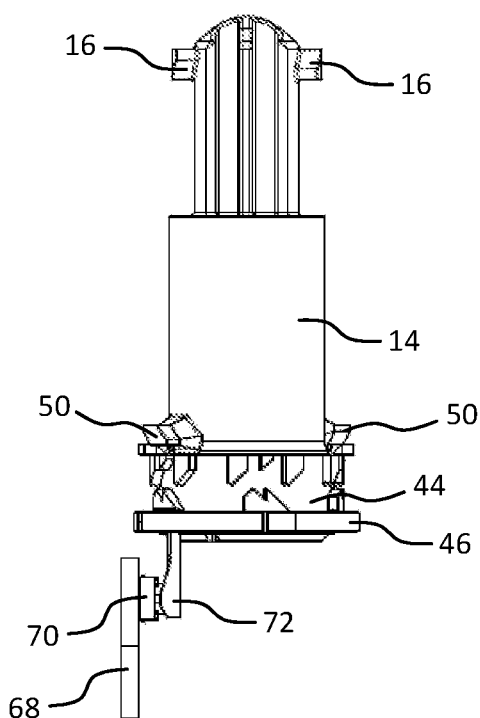
Figure 17:
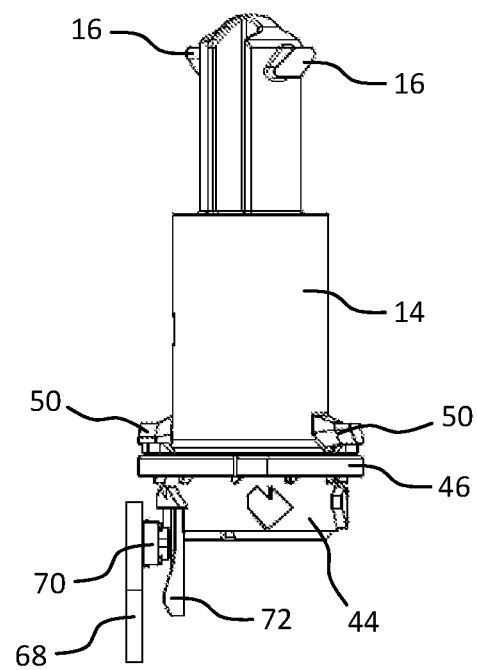
Figure 18:
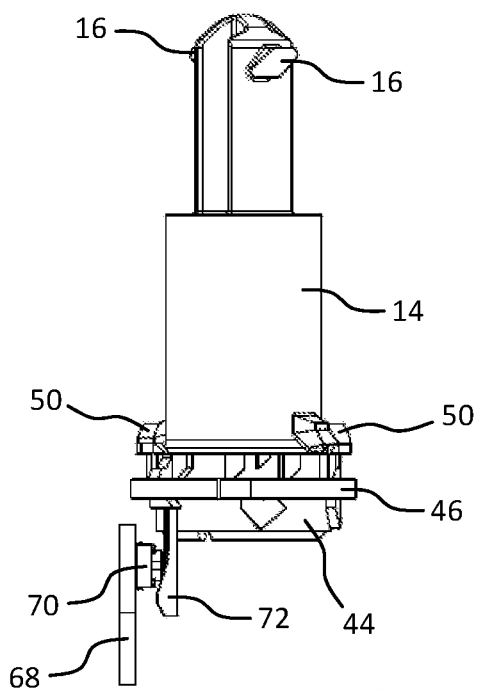

The interacting of the position protrusion 72 of the control sleeve 44 with the position switch 70 shall further be explained with the aid of FIGS. 16 to 18. In the opened position of the pusher 14 shown in FIG. 16 and furthest extended out from the housing 10, the position protrusion 72 actuates the position switch 70. On the other hand, in the state of the pusher 14 shown in FIGS. 17 and 18, having been forced into the housing, no actuating occurs. In the example shown, it is therefore possible in this way to recognize the opened position of the cover in the context of a position recognition system.

Figure 19:
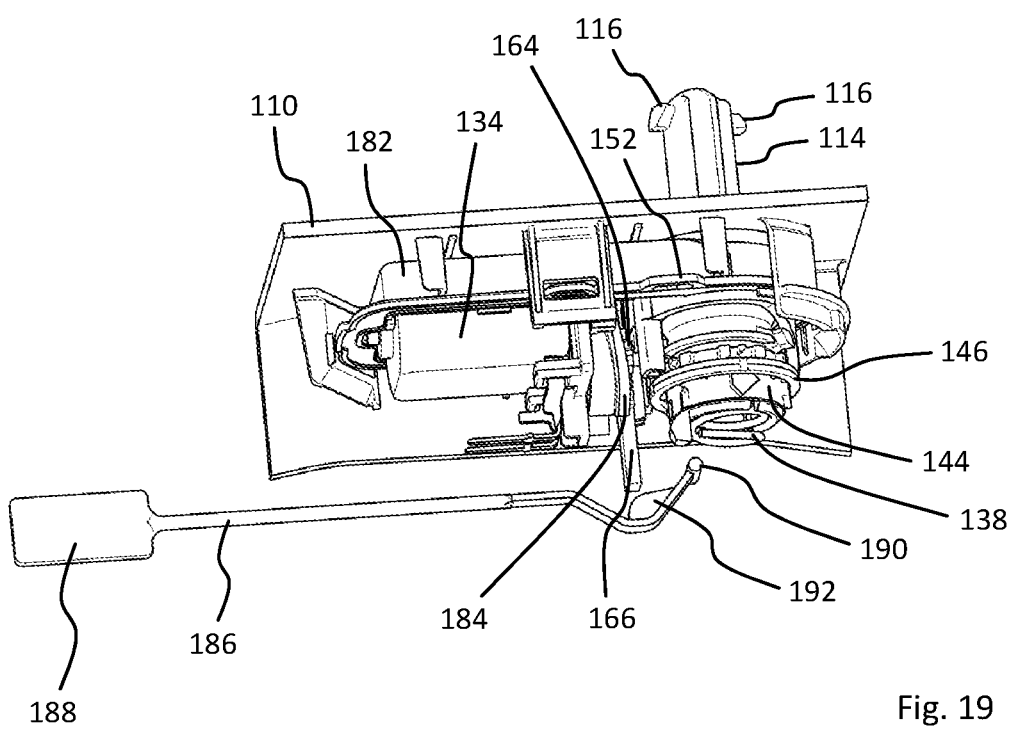
Figure 20:
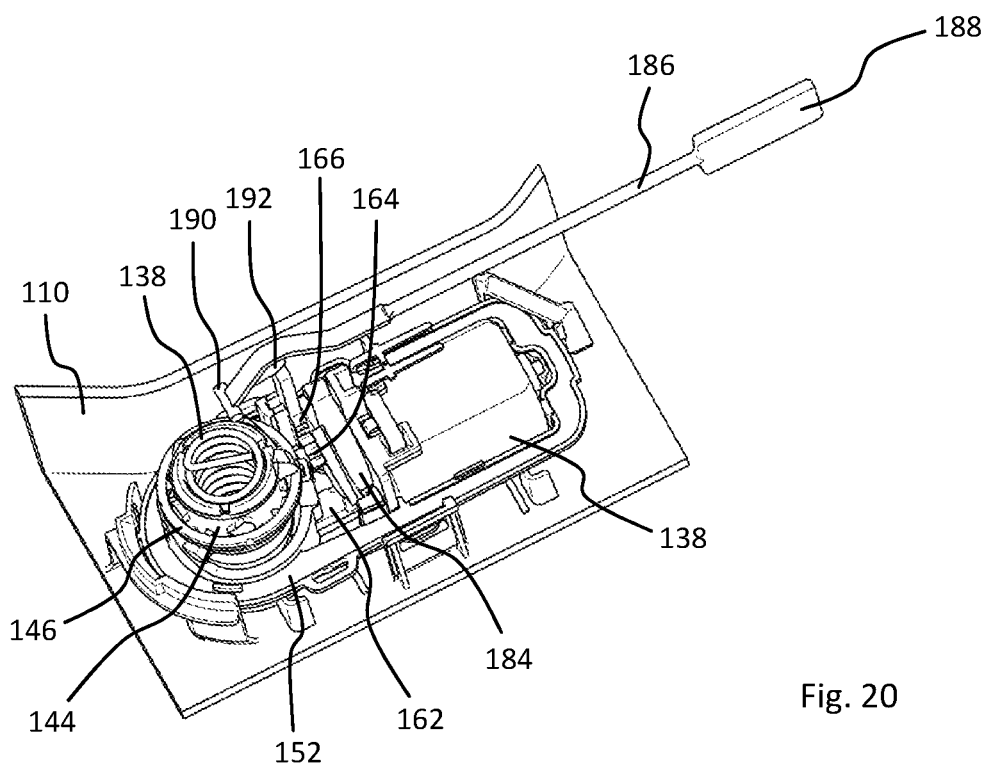
Figure 21:
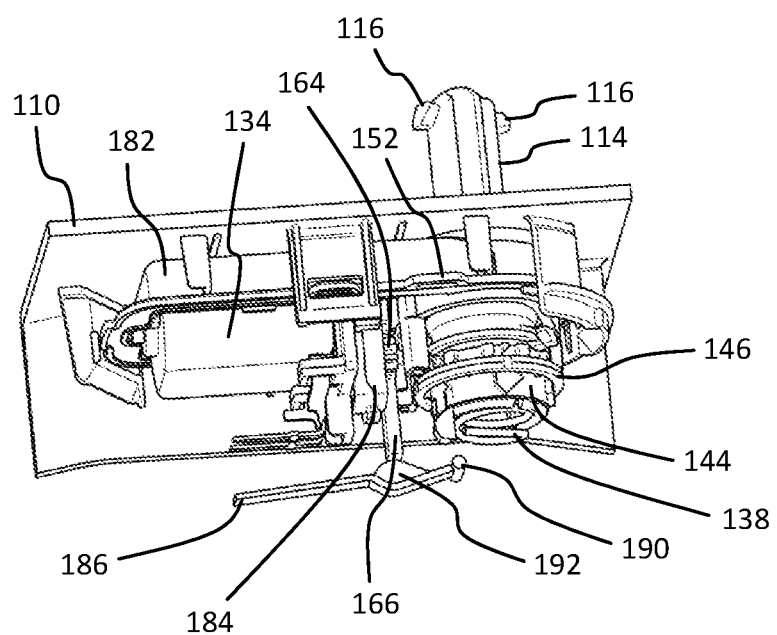

In FIGS. 19 to 21 a second embodiment of an inventive actuating apparatus is shown. For a better understanding, parts of the actuating apparatus, in particular the housing 110 of the actuating apparatus, are partially cut away. The actuating apparatus of the second embodiment also comprises a pusher 114 with actuating protrusions 116. The pusher 114 and the actuating protrusions 116 interact with an actuating sleeve, as shown and explained with regard to the first embodiment according to FIGS. 1 to 18. This shall therefore not be explained in further detail. The function and arrangement of the pusher 114 in the actuating apparatus according to the second embodiment are identical to the first embodiment as explained above with regard to FIGS. 1 to 18. In FIGS. 19 to 21 for example a control sleeve 144 and a control ring 146 can be seen which are identical to control sleeve 44 and control ring 46 according to the above explained first embodiment. This is also true for helical spring 138 shown in FIGS. 19 to 21. Pusher 114 is accordingly designed correspondingly to pusher 14. The actuating apparatus according to the second embodiment also comprises an intermediate plate 152 with a stop surface, a ramp and an annular groove, said intermediate plate 152 provides the same function as intermediate plate 52 with stop surface 54, ramp 56 and annular groove 58 of the first embodiment explained above. The kinematics of pusher 114 are thus identical to the kinematics of pusher 14 explained above, and these kinematics shall therefore not be further explained in this regard.

An electric motor 134 is held in a reception section 182 of housing 110. As can be seen in FIGS. 19 to 21 the position of electric motor 134 of the second embodiment is rotated by about 90° compared to the first embodiment shown in FIGS. 1 to 18. The actuating apparatus according to the second embodiment also comprises a blocking bolt 162 which in FIG. 20 is shown in a blocking position where it engages a blocking recess in pusher 114 for the blocking of the pusher 114 and thus the cover in a position of the pusher 114 locked in the housing. As explained with regard to the above first embodiment, also in the second embodiment the electric motor 134 is used for this. In the second embodiment electric motor 134 drives a gear wheel 164 which moves the blocking bolt 164 through a cam control comprising cam 184. In this manner the blocking bolt 164 can be moved in a direction running perpendicular to the longitudinal axis of the pusher 114 between a blocking position engaging the blocking recess of the pusher 114 and a release position retracted from the blocking recess of the pusher 114.

The embodiment shown in FIGS. 19 to 21 differs from the first embodiment shown in FIGS. 1 to 18 with regard to the emergency unlocking system. Also in the second embodiment a rack 166 is provided for manual unlocking of the blocking bolt 164. Rack 166 is movable along its longitudinal direction which is parallel to the longitudinal direction of the pusher 114 and engages with gear wheel 164. A pulling strap 186 is provided which can be manually pulled. Pulling strap 186 comprises an engagement end 188 which can be manually engaged for pulling the pulling strap 186. The opposite end 190 of pulling strap 186 is positionally fixed in housing 110 which is not shown in FIGS. 19 to 21 for matters of better understanding. It is also noted that in FIG. 21 pulling strap 186 is only shown partially. Pulling strap 186 is elastic and further comprises an actuating section 192.

FIGS. 19 and 20 show an inactive position of pulling strap 186. In this position rack 166 is driven by gear wheel 164, which in turn is driven by electric motor or 134. Upon manually pulling the pulling strap 186 through engagement end 188 pulling strap 186 is elastically deformed and actuating section 192 is pushed against rack 166 which is consequently moved along its longitudinal direction, in FIGS. 19 and 21 upwards. This again drives gear wheel 164 which correspondingly retracts blocking bolt 162 from the blocking recess of pusher 114 such that the device is manually unlocked in case of failure of electric motor 134.

LIST OF REFERENCE NUMBERS

10 Housing
12 Housing opening
14 Pusher
16 Actuating protrusions
18 Electrical terminal
20 Actuating sleeve
22 Actuating grooves
24 End receptacles
26 Fastening portion
28 Base body
30 Cover
32 Sealing ring
34 Electric motor
36 Electrical contacts
38 Helical spring
40 Journal
42 Inner actuating end
44 Control sleeve
46 Control ring
48 Control protrusions
50 Stop protrusions
52 Intermediate plate
54 Stop surface
56 Ramp
58 Annular groove
60 Blocking recess
62 Blocking bolt
64 Gear wheel
66 Rack
68 Switch plate
70 Micro switch
72 Position protrusion
74 First deflection surfaces
76 Locking recesses
78 Second deflection surfaces
80 Guide surfaces
110 Housing
114 Pusher
116 Actuating protrusions
134 Electric motor
138 Helical spring
144 Control sleeve
146 Control ring
152 Intermediate plate
162 Blocking bolt
164 Gear wheel
166 Rack
182 Reception section
184 Cam
186 Pulling strap
188 Engagement end of pulling strap
190 Opposite end of pulling strap
192 Actuating section

What is claimed is:

1. Actuating apparatus for opening and closing a cover in or on a vehicle, having push-push kinematics which interact with the cover, comprising:
 a housing (10, 110) which is suitable for being installed in a vehicle,
 a pusher (14, 114) which is mounted in the housing (10, 110) so as to be rotatable about its longitudinal axis and axially movable and which has an outer actuating end that projects out of the housing (10, 110) via a housing opening (12) in every axial position and an inner actuating end (42) that is located opposite the outer actuating end and is located within the housing in every axial position,
 a spring (38, 138) in the housing (10, 110), said spring (38, 138) preloading the pusher (14, 114) into a position extended furthest out of the housing (10, 110),
 an actuating sleeve (20) which is connected or connectable to the cover or a part carrying the cover and into which the pusher (14, 114) is introducible with its outer actuating end, and on the inner side of which at least one actuating groove (22) that extends at least partially in a helical manner about the longitudinal axis of the actuating sleeve (20) is formed, at least one actuating protrusion (16, 116) of the pusher (14, 114) engaging in said actuating groove with the pusher (14, 114) introduced into the actuating sleeve (20), such that, during an axial relative movement between the actuating sleeve (20) and pusher (14, 114), the pusher (14, 114) is also rotated about its longitudinal axis, wherein the spring (38, 138) is twisted counter to its preload during a rotation of the pusher (14, 114) while the pusher (14, 114) is being introduced into the actuating sleeve (20),
 a control sleeve (44, 144) which is arranged in the housing (10, 110) in a rotationally fixed and axially displaceable manner and with which the inner actuating end (42) of the pusher (14, 114) cooperates such that, during an axial movement of the pusher (14, 114) in the housing (10, 110), the control sleeve (44, 144) is moved axially along therewith, wherein the pusher (14, 114) is rotatable relative to the control sleeve (44, 144), and
 a control ring (46, 146) which surrounds the control sleeve (44, 144) at least over a part of the axial adjustment region of the pusher (14, 114) and which is mounted in an axially fixed and rotatable manner in the housing (10, 110), and which has at least one control protrusion (48) on its inner circumference, said control protrusion (48) engaging in a push-push control curve formed on the outer side of the control sleeve (44, 144).

2. Actuating apparatus according to claim 1, characterized in that the push-push control curve comprises at least one first deflection surface (74) which extends obliquely with respect to the axis of the control sleeve (44, 144) and which cooperates with the at least one control protrusion (48) of the control ring (46, 146) and rotates the control ring (46, 146) through a predetermined angle in a direction of rotation when the control sleeve (44, 144) is moved into the housing (10, 110) with the pusher (14, 114) with a predetermined first stroke, in that the push-push control curve also comprises at least one locking recess (76), open towards the outer actuating end of the pusher (14, 114), at a circumferential distance from the at least one first deflection surface (74), said locking recess (76) receiving the at least one control protrusion (48) of the control ring (46, 146) when the pusher (14, 114) is released after the first stroke, with the result that the pusher (14, 114) is locked in a locking position in the housing (10, 110) with the control sleeve (44, 144) after a return stroke brought about by the preload of the spring (38, 138), and in that the push-push control curve also comprises at least one second deflection surface (78) that extends obliquely with respect to the axis of the control sleeve at the circumferential distance from the at least one locking recess (76), said second deflection surface (78) cooperating with the at least one control protrusion (48) of the control ring (46,146) when the control sleeve (44, 144) is moved further into the housing (10, 110) with the pusher (14, 114) from the locking position with a second stroke, with the result that the control ring (46, 146) is rotated through a predetermined second angle in the direction of rotation into a rotational position in which the control sleeve is movable into the position extended furthest out of the housing (10, 110) with the pusher (14, 114) by the preload of the spring (38, 138).

3. Actuating apparatus according to claim 1, characterized in that a seal is provided between the housing opening (12) and the pusher (14, 114), the seal formed by a sealing ring (32) surrounding the housing opening (12).

4. Actuating apparatus according to claim 1, characterized in that the at least one actuating groove (22) in the actuating sleeve (20) forms at least one end receptacle (24) at the inner end thereof, the at least one actuating protrusion of the pusher (14, 114) being received in said end receptacle (24), in the state introduced fully into the actuating sleeve (20), such that the pusher (14, 114) cannot be released therefrom without being rotated in the actuating sleeve (20) again.

5. Actuating apparatus according to claim 1, characterized in that the control sleeve (44, 144) is held in a latched manner on the inner actuating end (42) of the pusher (14, 114).

6. Actuating apparatus according to claim 1, characterized in that at least one first stop portion is provided on the housing (10, 110), and in that at least one second stop portion is provided on the inner actuating end (42) of the pusher (14, 114), wherein the stop portions cooperate such that an axial movement of the pusher (14, 114) into the housing (10, 110) is allowed only after it has entered the actuating sleeve (20) and passed through the at least one actuating groove (22).

7. Actuating apparatus according to claim 6, characterized in that the at least one first stop portion comprises at least one stop surface (54) in the form of an annular sector, and in that the at least one second stop portion comprises at least one stop protrusion (50) that bears against the at least one stop surface (54) in the form of an annular sector until the axial movement of the pusher (14, 114) into the housing (10, 110) is allowed.

8. Actuating apparatus according to claim 7, characterized in that at least one ramp (56) adjoins the at least one stop surface (54) in the form of an annular sector, the at least one stop protrusion (50) bearing against said ramp (56) at least temporarily during the axial movement of the pusher (14, 114).

9. Actuating apparatus according to claim 8, characterized in that the at least one stop surface (54) in the form of an annular sector and/or the at least one ramp (56) is/are formed on an intermediate plate (52) of the housing (10, 110).

10. Actuating apparatus according to claim 1, characterized in that a position sensor is provided which indicates an open and/or closed position of the cover.

11. Actuating apparatus according to claim 10, characterized in that the position sensor comprises a position switch (70) which is actuated by a position protrusion (72), formed on the pusher (14, 114) or the control sleeve (44, 144), when the cover is located in the open and/or closed position.

12. Actuating apparatus according to claim 1, characterized in that it furthermore comprises a blocking device with which the pusher (14, 114) is able to be prevented from extending out of the housing (10, 110) in a locking position retracted into the housing (10, 110).

13. Actuating apparatus according to claim 12, characterized in that the blocking device comprises a blocking bolt (62), and in that the pusher (14, 114) comprises a blocking recess (60) on its outer side, wherein the blocking bolt (62, 162) is adjustable by an electric motor (34, 134), between a blocking position engaging in the blocking recess (60) and a release position withdrawn from the blocking recess (60).

14. Actuating apparatus according to claim 13, characterized in that the drive device drives the blocking bolt (62, 162) via a gear wheel (64, 164) that is able to be driven in rotation, wherein a rack (66, 166) that is manually actuable is engaged with the gear wheel (64, 164).

15. Actuating apparatus according to claim 14, characterized in that a pulling device is provided wherein the rack (166) is actuable through manually pulling the pulling device.

16. Actuating apparatus according to claim 15, characterized in that the pulling device is elastic and is deformed upon manual pulling whereby the rack (166) is actuated.

17. Actuating apparatus according to claim 16, characterized in that the pulling device is a pulling strap (186) comprising a manually engagable engagement end (188) wherein the opposite end (190) of the pulling strap (186) is positionally fixed.

18. Actuating apparatus according to claim 17, characterized in that the pulling device comprises an actuating section (192) which upon manual pulling exerts a pushing force onto the rack (166).

19. Cover of a vehicle, comprising an actuating apparatus according to claim 1.

20. Actuating apparatus for opening and closing a cover in or on a vehicle, having push-push kinematics which interact with the cover, comprising:
a housing (10, 110) configured for being installed in a vehicle,
a pusher (14, 114) mounted in the housing (10, 110) so as to be rotatable about a longitudinal axis of the pusher and axially movable, the pusher having an outer actuating end that projects from a housing opening (12) out of the housing (10, 110) in every axial position of movement of the pusher, the pusher having an inner actuating end (42) that is located opposite the outer actuating end and is located within the housing in every axial position of movement of the pusher,
a spring (38, 138) in the housing (10, 110), said spring (38, 138) preloading the pusher (14, 114) into a position extended furthest out of the housing (10, 110),
an actuating sleeve (20) connected to the cover or a part carrying the cover and into which the outer actuating end of the pusher (14, 114) is introducible, an inner side of of the actuating sleeve having at least one actuating groove (22) that extends at least partially in a helical manner about a longitudinal axis of the actuating sleeve (20), at least one actuating protrusion (16, 116) of the pusher (14, 114) engaging in said actuating groove when the pusher (14, 114) is introduced into the actuating sleeve (20), such that, during an axial relative movement between the actuating sleeve (20) and the pusher (14, 114), the pusher (14, 114) is also rotated about the longitudinal axis of the pusher, wherein the spring (38, 138) is twisted counter to its preload during rotation of the pusher (14, 114) while the pusher (14, 114) is being introduced into the actuating sleeve (20), a control sleeve (44, 144) arranged in the housing (10, 110) in a rotationally fixed and axially displaceable manner and with which the inner actuating end (42) of the pusher (14, 114) cooperates such that, during axial movement of the pusher (14, 114) in the housing (10, 110), the control sleeve (44, 144) is moved axially along with the pusher, wherein the pusher (14, 114) is rotatable relative to the control sleeve (44, 144), and a control ring (46, 146) surrounding the control sleeve (44, 144) at least over a part of an axial adjustment region of the pusher (14, 114), the control ring mounted in an axially fixed and rotatable manner in the housing (10, 110), and the control ring having an inner periphery with at least one control protrusion, said control protrusion (48) engaging in a push-push control curve formed on an outer side of the control sleeve (44, 144).

* * * * *